(12) United States Patent
Raddatz

(10) Patent No.: US 7,593,648 B2
(45) Date of Patent: Sep. 22, 2009

(54) METHOD AND SYSTEM FOR HIGH BIT RATE FIBER-OPTIC COMMUNICATIONS

(75) Inventor: Lutz Raddatz, Plauen (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 509 days.

(21) Appl. No.: 11/095,767

(22) Filed: Mar. 31, 2005

(65) Prior Publication Data
US 2006/0222375 A1  Oct. 5, 2006

(51) Int. Cl.
*H04B 10/04* (2006.01)
(52) U.S. Cl. .................... 398/195; 398/27; 398/30
(58) Field of Classification Search ......... 398/141–144, 398/147–149, 158–160, 151, 162, 196, 26–30, 398/95
See application file for complete search history.

(56) References Cited

U.S. PATENT DOCUMENTS

| | | | |
|---|---|---|---|
| 6,226,424 B1 * | 5/2001 | Ball et al. ............... | 385/14 |
| 6,456,411 B1 * | 9/2002 | Ishikawa et al. ............ | 398/192 |
| 2001/0019436 A1 * | 9/2001 | Nakajima et al. .......... | 359/110 |
| 2002/0048062 A1 * | 4/2002 | Sakamoto et al. .......... | 359/124 |
| 2004/0264968 A1 * | 12/2004 | Cornwell et al. ........... | 398/92 |
| 2005/0226613 A1 * | 10/2005 | Raddatz ..................... | 398/27 |
| 2006/0193035 A1 * | 8/2006 | Zyskind et al. .......... | 359/337.4 |

* cited by examiner

*Primary Examiner*—Dzung D Tran

(57) ABSTRACT

A method and system for high bit rate fiber-optic communications utilize a wavelength tunable transmitter controlled by a feedback signal from an error analyzer associated with a received optical data stream.

21 Claims, 3 Drawing Sheets

US 7,593,648 B2

METHOD AND SYSTEM FOR HIGH BIT RATE FIBER-OPTIC COMMUNICATIONS

FIELD OF THE INVENTION

The invention relates to the field of fiber-optic communication systems and, in particular, to a method and system for high bit rate fiber-optic communications.

BACKGROUND OF THE INVENTION

In high bit rate fiber-optic communication systems, chromatic dispersion in transmission fibers is a critical distance-related factor impeding the quality of propagating optical data signals and, as such, a length of fiber-optic spans.

Chromatic dispersion is a property of an optical fiber that causes different wavelengths propagate along the fiber at different speeds. As any signal has a certain spectral width, chromatic dispersion causes the signal becoming more and more distorted when the signal propagates along the fiber. Chromatic dispersion of a fiber may vary as the fiber ages or because of environmental factors, such as changes of temperature, atmospheric pressure, and the like.

Without special compensation techniques, chromatic dispersion imposes a limit on a transmission distance and a modulation bit rate of a fiber-optic communication system.

In a conventional fiber-optic communication system, data is transmitted through a transmission fiber at a fixed optical wavelength and the transmission fiber is associated with one or more dispersion compensation modules (DCMs) disposed at terminals of the system. To provide efficient compensation of chromatic dispersion in the transmission fiber, a large quantity (or granularity) of DCMs having incremental fixed amounts of chromatic dispersion or dispersion-controlled DCMs should be available.

The chromatic dispersion of optical fibers is a function of the wavelength. In conventional systems, the wavelength dependency of the DCM is selected to either cancel or reduce to an acceptable level the chromatic dispersion of the transmission fiber over the wavelength band of interest.

However, such means of compensating chromatic dispersion add to already high complexity and high cost of the fiber-optic communication systems.

SUMMARY OF THE INVENTION

Various deficiencies of the prior art are addressed by the present invention of a method and system for high bit rate fiber-optic communications.

In one embodiment of the invention a method of high bit rate fiber-optic communications includes the steps of transmitting optical data streams at selected optical wavelengths through a first fiber of a pair of fibers; analyzing error data in received optical data streams associated with terminals coupled to the span; and propagating a control signal toward a transmitter through at least one of a second one of the pair of fibers and a management network, the control signal adapted to modify an optical wavelength transmission parameter in a manner tending to reduce the error data.

In one embodiment, the feedback signal is transmitted between terminals of a fiber-optic communication system by other (i.e., return) transmission fiber of the fiber pair using low frequency/low modulation depth tone modulation of the data traffic in that fiber. In another embodiment, the feedback signal is transmitted between terminals of a fiber-optic communication system over a network management network.

In another embodiment, the feedback signal is transmitted using a means of a management network, e.g. a private data communication network of a service provider.

In other aspects of the invention are disclosed high bit rate fiber-optic communication systems suitable for executing the inventive method. In one embodiment, such a communication system comprises transmitting/receiving terminals coupled to one another by a fiber-optic span having at least one pair of single-mode transmission fibers, where each terminal includes a wavelength tunable transmitter, an optical receiver, and an error analyzer of received data.

BRIEF DESCRIPTION OF THE DRAWINGS

The teachings of the present invention can be readily understood by considering the following detailed description in conjunction with the accompanying drawings, in which.

Figure 1:
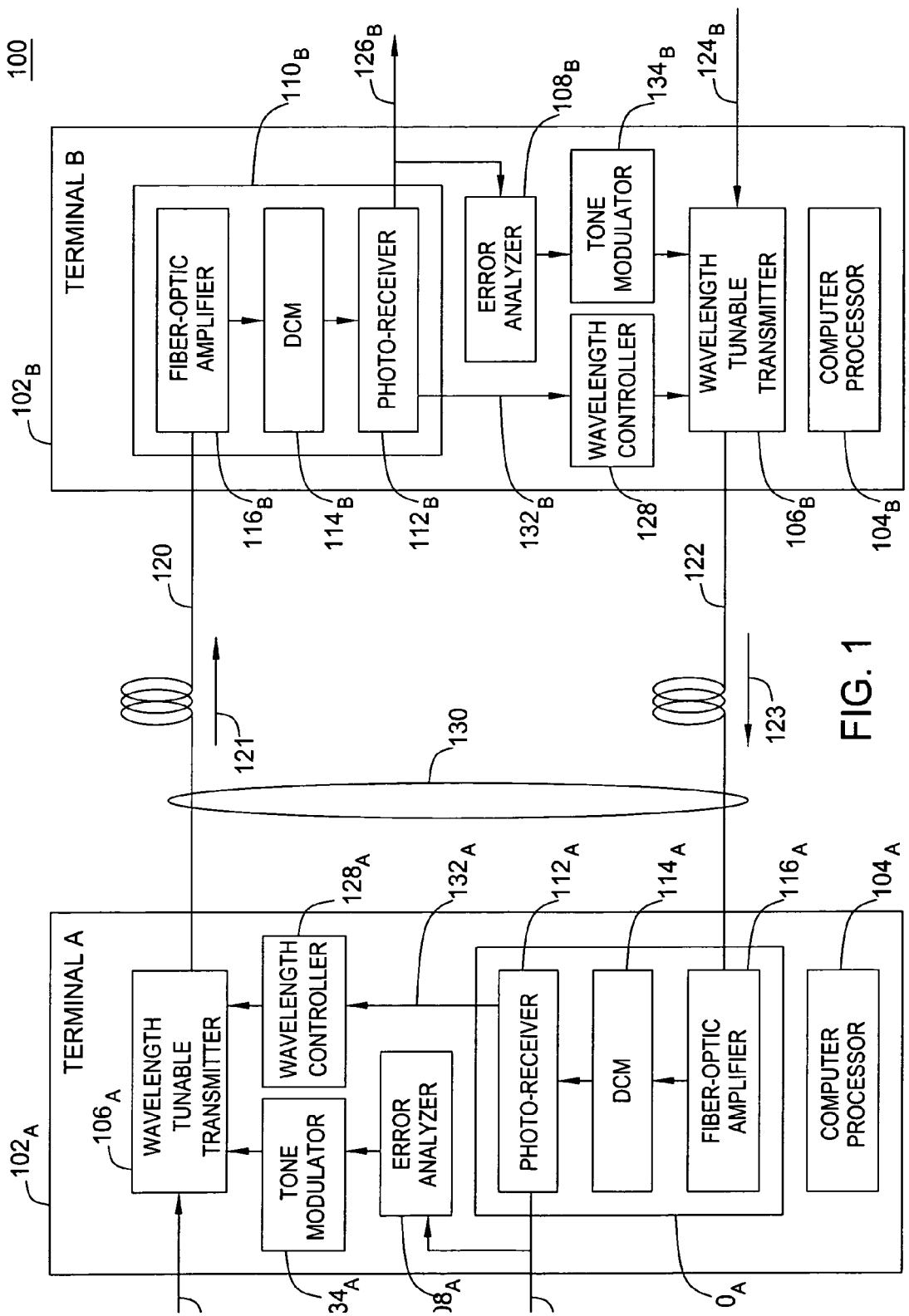
FIG. 1 depicts a high-level schematic diagram of a fiber-optic communication system suitable for use with the present invention.

It is to be noted, however, that the appended drawings illustrate only exemplary embodiments of this invention and are therefore not to be considered limiting of its scope, for the invention may admit to other equally effective embodiments.

DETAILED DESCRIPTION OF THE INVENTION

The present invention will be generally described within the context of fiber-optic communication systems. It will be appreciated by those skilled in the art that the invention may be utilized within the context of metro core and regional fiber-optic communication systems and networks, as well as undersea fiber-optic communication systems and networks and/or portions thereof.

Hereafter, similar apparatuses and devices are identified using the same numeric references, except that the suffixes "A" and "B" may be added, when appropriate, to differentiate between specific apparatuses and devices. These apparatuses and devices may also be referred to generally by their reference numeral without any appended suffix.

FIG. 1 depicts a high-level schematic diagram of a fiber-optic communication system suitable for use with the present invention. Specifically, the system 100 of FIG. 1 comprises transmitting/receiving terminals $102_A$ and $102_B$ coupled to one another using at least one fiber-optic pair 130 (one fiber-optic pair 130 is shown) of single-mode transmission fibers 120 and 122. In the depicted embodiment, the fiber 120 propagates optical data streams from the terminal $102_A$ to the terminal 102B, and the fiber 122 propagates such data streams from the terminal $102_B$ to the terminal $102_A$, as illustrated with arrows 121 and 123, respectively.

In one embodiment, each of the terminals 102 comprises a wavelength tunable transmitter 106, an optical receiver 110, an error analyzer 108, a tone modulator 134, and a wavelength controller 128 that are illustratively associated with the fiber pair 130, and a computer processor 104 administering operation of the terminal of the system 100. Alternatively (not shown), the error analyzer 108 may be intermittently shared in the respective terminal by fibers of two or more fiber pairs.

The wavelength tunable transmitter 106 typically comprises an electronically controlled solid-state laser (e.g., external cavity laser (ECL)) and a high bit rate modulator, such as an exemplary Mach-Zehnder modulator (both not shown). A wavelength tunable range of the transmitter 106 generally corresponds to an amplification bandwidth of optical amplifiers used in optical receivers of the system 100. In case of erbium doped fiber-optic amplifiers 116 (discussed below in reference to the optical receivers 110), tunable optical wavelengths of the transmitter 106 may be disposed in a range of about 1530 to 1565 nm.

An input of the transmitter 106 is coupled, using an electrical interface 124, to a source (not shown) of information (i.e., data steam) to be transmitted, such as a terminal of a wired communication network. In operation, the transmitter 106 converts the data streams communicated via the interface 124 from an electrical domain in the optical domain at a bit rate in a range from about 2.5 GB/s to 40 Gb/s or greater.

The high bit rate modulator of the transmitter 106 may use one of on/off keying modulation formats (e.g., non-return-to-zero (NRZ) format, return-to-zero (RZ) format, carrier suppressed RZ (CSRZ) format, and the like) or phase-shift keying formats (e.g., differential phase shift keying (DPSK) format) to modulate intensity and/or phase of an output signal of the laser of the transmitter.

A modulated output signal of the transmitter $106_A$ is coupled to an input of a corresponding transmission fiber (e.g., fiber 120) of the fiber pair 130 and propagates through that fiber to the optical receiver $110_B$ of the terminal $102_B$. Accordingly, an input and an output of the transmission fiber 122 are coupled to an output of the transmitter $106_B$ (terminal $102_B$) and an input of the optical receiver $110_A$ (terminal $102_A$), respectively.

In one embodiment, the optical receiver 110 generally includes a fiber-optic amplifier 116, a dispersion compensating module (DCM) 114, and a photo-receiver 112.

The fiber-optic amplifier 116 is, e.g., an erbium doped fiber-optic amplifier coupled to an output of the respective transmission fiber. Such fiber-optic amplifiers are well known in the art. In the system 100, the fiber-optic amplifiers 116 are used to compensate for losses of optical power of transmitted signals (i.e., optical data streams) during propagation through the fibers 120 and 122.

The DCM 114 has chromatic dispersion that is substantially inverse to such a property of the respective transmission fiber of the fiber-optic pair 130. In one embodiment, the DCM 114 entirely or near-entirely compensates chromatic dispersion of the transmission fiber at one or more wavelengths in the wavelength tuning range of the transmitter 106.

The DCM 114 may comprise at least one of a dispersion compensating fiber (DCF) and a fiber Bragg grating. In an alternate embodiment (not shown), a portion of the DCM 114 may conventionally be associated with the same transmission fiber in other terminal of the system 100.

The photo-receiver 112 is coupled to an output of the DCM 114 and converts a received data stream from an optical format in the electrical format compatible with an electrical interface 126 to a recipient (not shown) of the transmitted data stream. Additionally, the photo-receiver 112 detects feedback signals that, in the system 100, control quality (i.e., error content) of fiber-optic communication links.

Specifically, quality of the received (i.e., transmitted) data stream is monitored using the error analyzer 108, such as exemplary synchronous digital hierarchy (SDN) byte analyzer, forward error correction (FEC) analyzer, and the like. The error analyzer 108 produces an output information associated with transmission errors detected in the received data stream. Such errors are generally caused by insufficient compensation of chromatic dispersion in the respective transmission fiber. Detected error content may include bit errors, synchronization errors, and the like.

Error-related information collected from the error analyzers $108_A$ and $108_B$ is converted in an electrical format and used to achieve best compensation of chromatic dispersion in the fiber transmitted the data stream. In the system 100, such compensation of chromatic dispersion is achieved by adjusting a wavelength of the wavelength tunable transmitter 106 that originated the data stream being analyzed by the respective error analyzer.

In operation, the error analyzers $108_A$ and $108_B$ facilitate formation of control loops providing optimal compensation of chromatic dispersion in the transmission fibers 120 and 122. An error-related feedback signal produced, for example, by the error analyzer $108_B$, is communicated to the terminal $102_A$ by the transmission fiber 122 (i.e., return fiber, with respect to the fiber 120 transmitted the analyzed data stream) using a method of low frequency/low modulation depth tone modulation of the transmitter $106_B$. Correspondingly, such feedback signal produced by the error analyzer $108_A$ is communicated to the terminal $102_B$ by the transmission fiber 120 by similarly modulating the transmitter $106_A$.

In an alternate embodiment (not shown), the error signal may be transmitted to the respective wavelength controller $128_A$ or $128_B$ using at least one of wired, wireless, and fiber-optic means of a management network operating the system 100, e.g. a private data communication network of a service provider.

In the depicted embodiment, such modulation of the transmitter 106 with the error-related feedback signal is illustratively facilitated using the tone modulator 134 controlled by the error analyzer 108. In an alternate embodiment, the tone modulator 134 may be a portion of the transmitter 106.

Information carried by the feedback signal is detected in the photo-receiver 112 and, via a control interface 132, provided to the wavelength controller 128 of the transmitter 106, which originated that error-affected data stream. In one embodiment, the wavelength controller 128 selectively steps the wavelength of the transmitter 106 through the wavelength tuning range of the transmitter being adjusted until a number of errors in the data steam received at the other terminal is minimal.

In an alternate embodiment, the wavelength controller 128 may perform a wavelength dither algorithm to minimize an error content of the data steam being transmitted. In yet another embodiment, the wavelength controller 128 may be a portion of the computer processor 104.

In one embodiment, a bandwidth of the wavelength control channel and a depth of the tone modulation are about 5-200 kHz and 0.5-3%, respectively. Such modulation of the transmitters 106 has no effect on performance of high bit rate fiber-optic communication links between the terminals 102, as well as is insensitive to an amount of uncompensated chromatic dispersion in the fiber that are used for transmitting the feedback signals.

Figure 2:
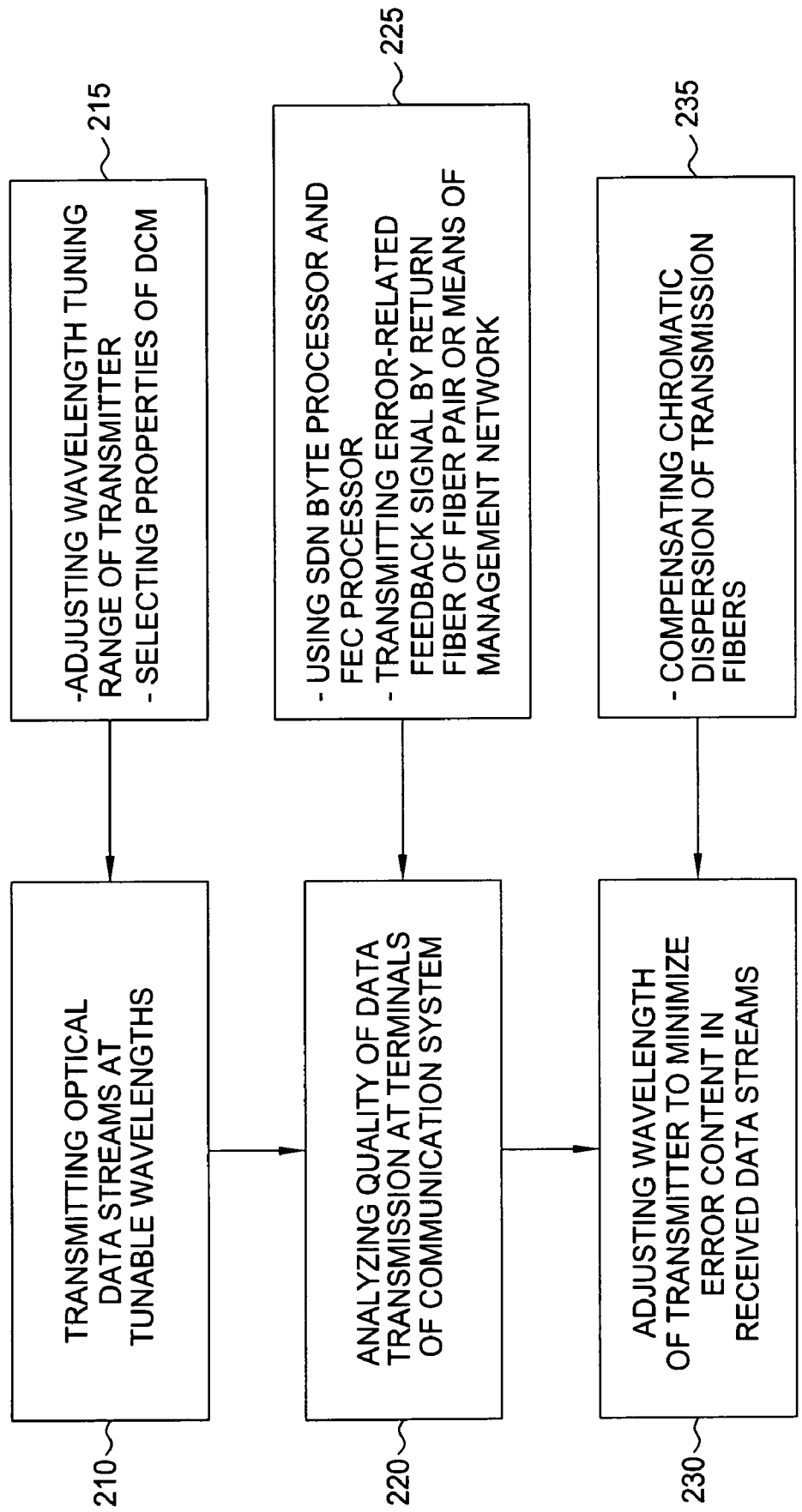
FIG. 2 depicts a flow diagram of a method for providing high bit rate fiber-optic communications using the system of FIG. 1 according to one embodiment of the present invention.

FIG. 2 depicts a flow diagram of a method for providing high bit rate fiber-optic communications using the system of FIG. 1. Specifically, the method of FIG. 2 contemplates several system functions suitable for use in accordance with the present invention.

The method of FIG. 2 starts at step 210 where high bit rate fiber-optic communication links are established between the terminals $102_A$ and $102_B$ of the system 100 using the transmission fibers 120 and 122. Optical data streams are originated using the wavelength tunable transmitters $106_A$ and $106_B$.

Referring to a box 215, a wavelength tuning range of the transmitters $106_A$ and $106_B$ is adjusted to correspond to an amplification bandwidth of the respective fiber-optic amplifiers $116_B$ and $116_A$, such as erbium doped fiber-optic amplifiers. Additionally, an amount of chromatic dispersion of the DCMs $114_A$ and $114_B$ is selectively adjusted to compensate, at one or more wavelength, entirely or near-entirely such a property of the transmission fibers 122 and 120 in the tuning range of the wavelength tunable transmitters $106_B$ and $106_A$, respectively.

At step 220, quality of transmitted data streams (e.g., number of transmission errors) is analyzed at the terminals $102_A$ and $102_B$ using the error analyzers $102_A$ and $102_B$, respectively. A feedback signal corresponding to an amount of detected errors is outputted to a tone modulator providing low frequency/low modulation depth tone modulation of the transmitter of the terminal where the received data stream has been analyzed.

Referring to a box 225, a SDH byte analyzer, a forward error correction (FEC) analyzer, and the like means may be used to determine a quality level of the received data stream. A feedback signal from the receiving terminal to the terminal transmitted the analyzed data stream is delivered using a transmission fiber that may simultaneously carry high bit rate data traffic. Alternatively, the feedback signal may be communicated using a wired, wireless, and/or fiber-optic means of a management network of a service provider (not shown) operating the system 100.

At step 230, the transmitted feedback signal is detected at the terminal, which transmitted the error-containing data stream and is used to adjust the wavelength of the transmitter 106 originated that date stream. The wavelength is adjusted, within a tuning range of the transmitter, until a pre-determined minimal error content is achieved in the data streams delivered from that transmitter.

Referring to a box 235, adjustment of the wavelength of the transmitter 106 facilitates compensation of chromatic dispersion in the transmission fibers of the system 100.

In one embodiment of the invention, the DCM is adapted such that its chromatic dispersion cancels that of the transmission fiber only one wavelength inside the wavelength band of interest. This means that the dispersion slope of the DCM does not need to cancel the entire dispersion slope of the transmission fiber. Dispersion compensation of the transmission system is achieved by tuning the transmitter to this specific wavelength, using the control algorithm described above.

Figure 3:
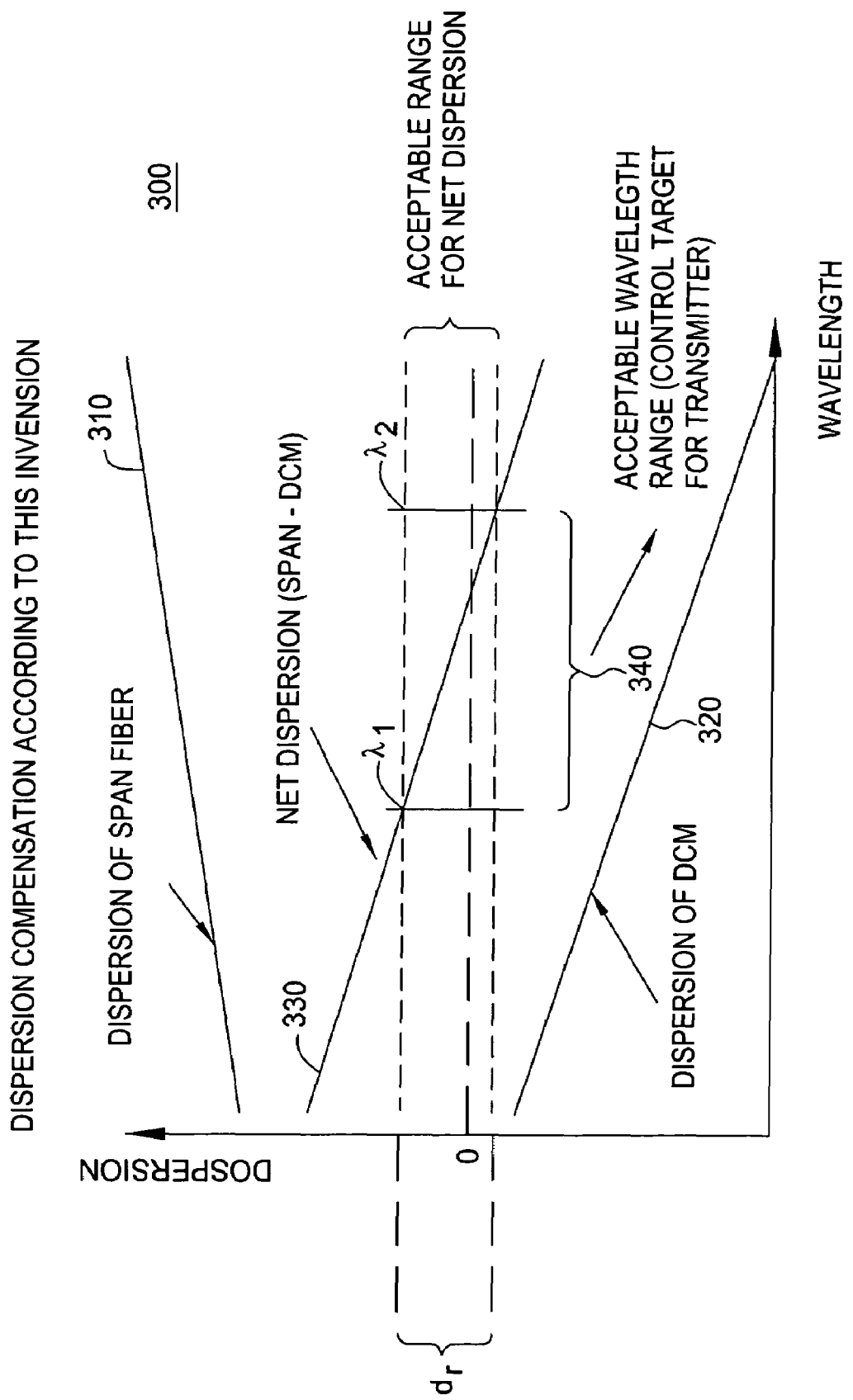
FIG. 3 depicts a graphical representation of dispersion compensation according to an embodiment of the invention.

FIG. 3 depicts a graphical representation of dispersion compensation according to an embodiment of the invention. Specifically, FIG. 3 depicts dispersion as a function of wavelength to show that the dispersion of span fiber 310, when compensated by the dispersion of the DCM 320 results in a net dispersion 330. A portion of the net dispersion bounded by a first wavelength ($\lambda_1$) and a second wavelength ($\lambda_2$) is within an acceptable range of net dispersion $d_r$.

The uncompensated dispersion slope leads to a net dispersion slope of the system (i.e., of transmission fiber together with DCMs). This dispersion slope, taken over the wavelength band of interest, defines the net dispersion range over which a transmission system utilizing the present invention can be tuned. This dispersion range is related to the tuning range achievable with the DCMs, the measurement inaccuracy of the transmission fiber and the like.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. Method for high bit rate fiber-optic communications over a span having at least one pair of single-mode transmission fibers, comprising:
    transmitting optical data streams at selected optical wavelengths through a first fiber of said at least one pair of single-mode transmission fibers;
    analyzing error data in received optical data streams associated with terminals coupled to the span;
    propagating a control signal toward a transmitter through at least one of a second fiber of said at least one pair of single-mode fibers and a management network, said control signal adapted to modify optical wavelength transmission parameters in a manner tending to reduce said error data;
    modifying optical wavelength transmission parameters in response to said control signal by incrementally changing a tunable optical wavelength associated with transmitted optical data streams to transmit the optical data streams at a tunable optical wavelength providing compensation of chromatic dispersion;
    the terminals including a means for compensating chromatic dispersion in a transmission fiber for at least one wavelength in a range of tunable optical wavelengths; and
    transmitting the optical data streams at said at least one wavelength providing compensation of chromatic dispersion in a transmission fiber.

2. The method of claim 1, wherein the analyzing step uses error data produced by a byte processor or a forward error correction processor.

3. The method of claim 1, wherein the tunable optical wavelengths are disposed in a range of about 1530 to 1565 nm.

4. The method of claim 1 wherein the means for compensating chromatic dispersion comprises at least one of a dispersion compensation fiber and a fiber grating.

5. The method of claim 1 wherein the control signal is transmitted using low frequency/low modulation depth tone modulation of the transmitter in a terminal receiving the transmitted optical data streams.

6. The method of claim 1 wherein the error data includes at least one of a number of synchronization errors and a number of bit errors.

7. The method of claim 1 wherein the optical data streams are formed at a bit rate in a range from about 2.5 Gb/s to 40 Gb/s using an on/off keying modulation format.

8. The method of claim 1 wherein the optical data streams are formed at a bit rate above 40 Gb/s using an on/off keying modulation format.

9. The method of claim 1 wherein said control signal is transmitted via a management network comprising at least one of a wired, wireless and fiber-optic means of data communications.

10. A system for high bit rate fiber-optic communications, comprising:
    a span having at least one pair of single-mode transmission fibers;
    a first terminal coupled to a first end of the span; and
    a second terminal coupled to a second end of the span;
    wherein each terminal comprises:
    a wavelength tunable transmitter;
    an optical receiver comprising an optical amplifier, a chromatic dispersion compensating module, and a photo-receiver; and an error analyzer associated with a received optical data stream, wherein the error analyzer provides a feedback signal controlling a wavelength of the wavelength tunable transmitter of the received optical data stream;

wherein the chromatic dispersion compensating module is tunable to substantially compensate for the dispersion of the received optical data stream for at least one wavelength in a range of wavelengths of the wavelength tunable transmitter; and wherein the wavelength tunable transmitter is configured to adjust the wavelength of the wavelength tunable transmitter to said at least one wavelength.

11. The system of claim 10 wherein a tuning range of the wavelength tunable transmitter is about 1530 to 1565 nm.

12. The system of claim 10 wherein the wavelength tunable transmitter is an electronically controlled solid-state laser.

13. The system of claim 10 wherein the optical amplifier is an erbium-doped fiber-optic amplifier.

14. The system of claim 10 wherein the bit rate of the optical data streams is in a range from about 2.5 Gb/s to 40 Gb/s.

15. The system of claim 10 wherein the error analyzer comprises a byte processor and/or a forward error correction processor.

16. The system of claim 10 wherein the feedback signal is transmitted using a fiber complimentary to the fiber of a pair of single-mode transmission fibers transmitting the received optical data stream.

17. The system of claim 10 wherein the feedback signal is transmitted using at least one of a wired, wireless and fiber-optic management network.

18. The system of claim 10 wherein the feedback signal is a low frequency/low modulation depth tone modulation of the wavelength tunable transmitter of the terminal receiving the received optical data stream.

19. The system of claim 10 wherein the chromatic dispersion compensating module comprises at least one of a dispersion compensation fiber and a fiber grating.

20. The system of claim 10 wherein the wavelength of the wavelength tunable transmitter is incrementally adjusted to reduce transmission errors in received optical data streams.

21. The system of claim 20 wherein the wavelength is incrementally changed in a tuning range of the wavelength tunable transmitter in a manner tending to reduce errors in the received optical data streams.

* * * * *

UNITED STATES PATENT AND TRADEMARK OFFICE
CERTIFICATE OF CORRECTION

PATENT NO. : 7,593,648 B2  Page 1 of 1
APPLICATION NO. : 11/095767
DATED : September 22, 2009
INVENTOR(S) : Lutz Raddatz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1000 days.

Signed and Sealed this

Fourteenth Day of December, 2010

David J. Kappos
*Director of the United States Patent and Trademark Office*